July 9, 1929.  W. E. WREAD  1,720,639

LATCH BOLT GUIDE

Filed Sept. 4, 1926

INVENTOR
WILLIAM E. WREAD
by James R. Townsend
his atty

WITNESS
Robt. S. Woolsey

Patented July 9, 1929.

1,720,639

UNITED STATES PATENT OFFICE.

WILLIAM E. WREAD, OF LOS ANGELES, CALIFORNIA, ASSIGNOR, BY MESNE ASSIGNMENTS, TO McKINNEY MANUFACTURING COMPANY, OF PITTSBURGH, PENNSYLVANIA, A CORPORATION OF PENNSYLVANIA.

LATCH-BOLT GUIDE.

Application filed September 4, 1926. Serial No. 133,629.

Certain features of the invention herein defined are disclosed but not claimed in my copending application Serial No. 53,548, filed August 31, 1925; application No. 133,627, filed Sept. 4, 1926; application No. 133,628, filed Sept. 4, 1926, and application No. 133,630, filed September 4, 1926.

An object of this invention is to make provision whereby the bolt of a lock or latch can be easily, quickly and accurately installed in a door or other closure and connected with the operating means by which the bolt may be extended into and retracted from latching position.

The invention is broadly new, basic and pioneer, in that the shank of the bolt is screwed into the bolt operating means and is non-rotatable in and operable through a cylindrical guide having external buttress threads so that in installing the bolt in connection with latch mechanism and the closure to be held thereby, the bolt may be inserted in a cylindrical hole in the closure adapted to subsequently receive the guide; and when the bolt has been screwed into said bolt operating mechanism to proper adjustment with relation to the edge of the closure and in proper angularity with the strike with which the bolt is to engage, the guide may be placed on the bolt and driven into place in the hole in the closure thus retaining the bolt in the position relative to the sides of the closure; an advantage of the buttress external threads on the guide being that they not only hold the guide in true position in the closure, but also allow the guide to be unscrewed from the closure simultaneously with the unscrewing of the bolt when it is desired to take out the bolt for readjustment or for any other purpose.

Other objects, advantages and features of invention may appear from the accompanying drawing, subjoined detail description and the appended claims.

The accompanying drawing illustrates the invention.

Figure 1:
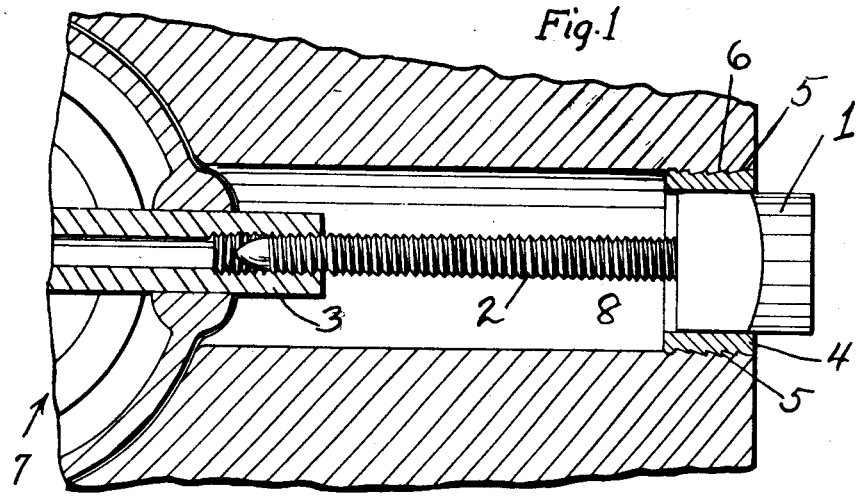
Figure 1 is a view of the newly invented bolt and guide installed in a latch mounted in a closure which is shown in section; only fragments of the latch and closure are shown.
Figure 2:
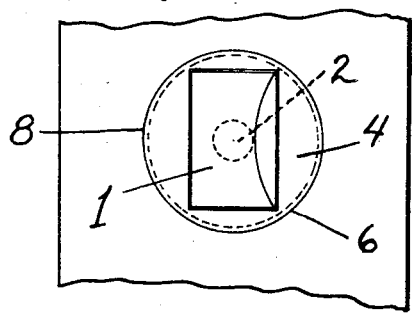
Fig. 2 is a fragmental edge view of the closure with bolt and guide in place.
Figure 3:
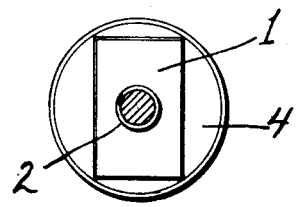
Fig. 3 is an inside elevation of the bolt and guide assembled together and detached from the closure and the bolt operating mechanism.
Figure 4:
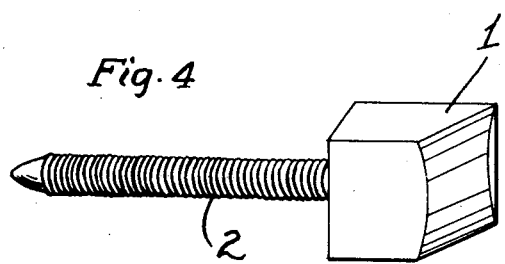
Fig. 4 is a perspective view of a latch bolt detached.

It is understood that the guide is adapted for use alike with either latch bolts or lock bolts and it is unnecessary to show more than one form of bolt.

The bolt 1 may be of any approved form and provided with a threaded shank or stem 2 adapted to be screwed into any form of bolt operating mechanism 3 and non-rotatable relative to the guide 4 which is circular in cross section and is provided with buttress threads 5, of the same trend as the threads on the shank 2 so that when the shank and guide are turned in the direction to withdraw the shank from the bolt operation mechanism, 3, the guide will also be unscrewed in the same direction. The buttress threads are adapted to allow the guide to be driven into the hole 6 provided to receive the guide, and to accommodate the connection between the bolt and the bolt operating mechanism of the latch 7; and to withdraw the guide when the bolt is turned to unscrew its shank from the bolt operating mechanism.

The bolt and guide may be manufactured in any well known manner adapted to such manufacture, and in practical installation thereof in a closure, the latch, as at 7, will first be installed in the closure in which the hole 6 has been formed, and then the stem will be inserted into the hole and screwed into the bolt operating part 3; then the guide will be placed on the bolt, care being taken that the bolt is adjusted in proper angularity with the sides 8 of the closure, and then the guide may be driven into place in the closure as indicated in Fig. 1.

In case it is desired to remove the bolt for any purpose the bolt may be turned by a wrench or other suitable means, thus unscrewing it from the bolt operating mechanism; and since the bolt is non-rotatable relative to the guide it revolves the guide, thus unscrewing the guide from the closure. The non-rotatable relation of the bolt to the guide may, of course, be accomplished in many ways. In the example here shown the usual rectangular form in cross section is given to the bolt 1 with a corresponding orifice in the guide 4. This is merely illustrative, however, the essential point being that there should be a non-rotatable condition between the assembled bolt and the guide.

Figure 5:
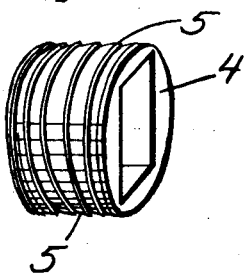
Fig. 5 is a detached view of the bolt guide.

The buttress threads 5 are preferably of barb form as shown in Figs. 1 and 5 and the insert end *a* of the guide is bevelled so that the guide may be easily driven into the hole 6 in the closure thus allowing the fibre of the closure to close in on the threads so that the thread will thrust out the guide when the bolt is turned as shown.

I claim:—

1. A bolt and guide assembly comprising a bolt and a guide therefor, said bolt being slidable in and non-rotatable relative to the guide and provided with a threaded stem, said guide being threaded so that when the bolt is revolved to unscrew its stem from the mechanism adapted to operate the same, said bolt will turn the guide to unscrew it from its seat.

2. The combination with a bolt guide having external buttress threads, of a bolt slidable in and non-rotatable relative to the guide and provided with a threaded stem adapted to screw into bolt operating means.

3. The combination with a latch having bolt operating means and a body provided with a hole to accommodate the bolt stem; of a guide in which the bolt is slidable and non-rotatable, said guide being provided with external buttress threads and adapted to be driven into said hole and to be in threaded engagement with the walls of the hole so that when the bolt is turned to unscrew it from its engagement with the bolt operating mechanism, the bolt will turn the guide to unscrew it from the hole.

4. In a bolt and guide assembly for closures; a bolt guide having barb like threads and adapted to be driven into a hole in a closure, and provided with a guideway, and a bolt slidable in and nonrotatable in the guideway so that by turning the bolt the guide may be unscrewed.

5. The combination with a latch bolt operative mechanism, including a closure opening leading from said mechanism; of a guide formed with exteriorly disposed buttress threads and adapted to be driven into the closure opening; said guide being formed with an opening; a bolt element having its outer end slidably and non-rotatably mounted in said guide, and its inner end detachably connected to the bolt operating mechanism, and said guide adapted to be unscrewed from the closure opening simultaneously with the unscrewing of said bolt from the bolt operating mechanism.

6. A bolt guide comprising an element adapted to be engaged in a seat and removed therefrom by rotation, said element having an opening therethrough to receive and hold a bolt in reciprocable and non-rotatable position relative to said guide, whereby, upon rotation of the bolt said guide will be rotatably removed from the seat.

7. A bolt guide comprising an exteriorly threaded element adapted to be engaged in a seat and rotatably removed therefrom, said guide having an opening therethrough to receive and hold a bolt in non-rotatable position relative to said guide, whereby, upon rotation of the bolt said guide will be rotatably removed from the seat.

8. A bolt guide comprising an exteriorly threaded element adapted to be engaged in a seat and rotatably removed therefrom, said guide having an opening to receive and hold a bolt in non-rotatable position relative to said guide, whereby, upon rotation of the bolt said guide will be unscrewed from its seat.

9. In a fixture of the class described, the combination of a bolt detachable by rotation from its operating mechanism, a bolt-guide in which said bolt is reciprocably and non-rotatably mounted, and means to secure said guide to a seat, whereby, upon rotation of said bolt to release it from its operating mechanism said guide will be rotatably removed from its seat.

10. In a fixture of the class described, the combination of a bolt having screw threaded engagement with its operating mechanism, and a bolt-guide having a threaded exterior adapted to secure it to a seat in which said bolt is reciprocably and non-rotatably mounted, whereby, upon rotation of said bolt to unscrew it from its operating mechanism said guide will be unscrewed from its seat.

11. In a fixture of the class described, the combination of a bolt comprising a non-circular head and a screw threaded extension adapted to engage a threaded aperture in a bolt operating mechanism, a threaded guide adapted to engage a seat and having a non-circular opening in which the head of said bolt reciprocates, whereby, upon rotation of the bolt to unscrew it from its operating mechanism, said guide will be unscrewed from its seat.

In testimony whereof, I have hereunto set my hand at Los Angeles, California, this 1st day of July, 1926.

WILLIAM E. WREAD.